INVENTOR.
HAROLD G. BAILEY
BY Ely, Frye & Hamilton
ATTORNEYS

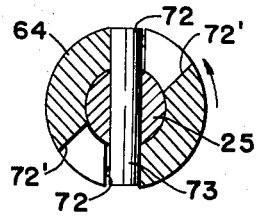
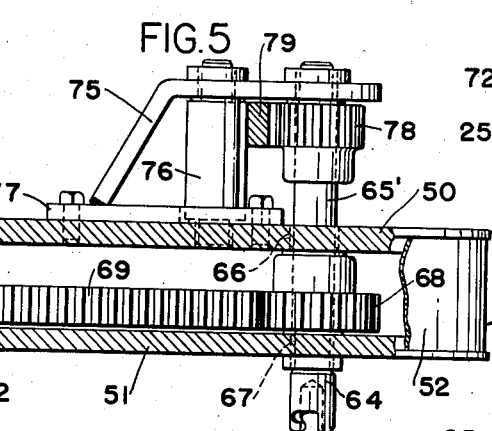
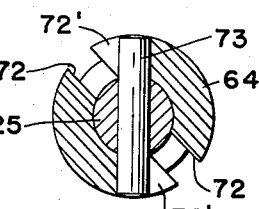
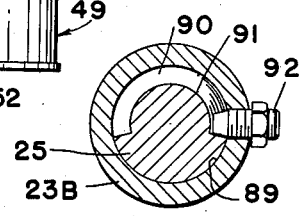
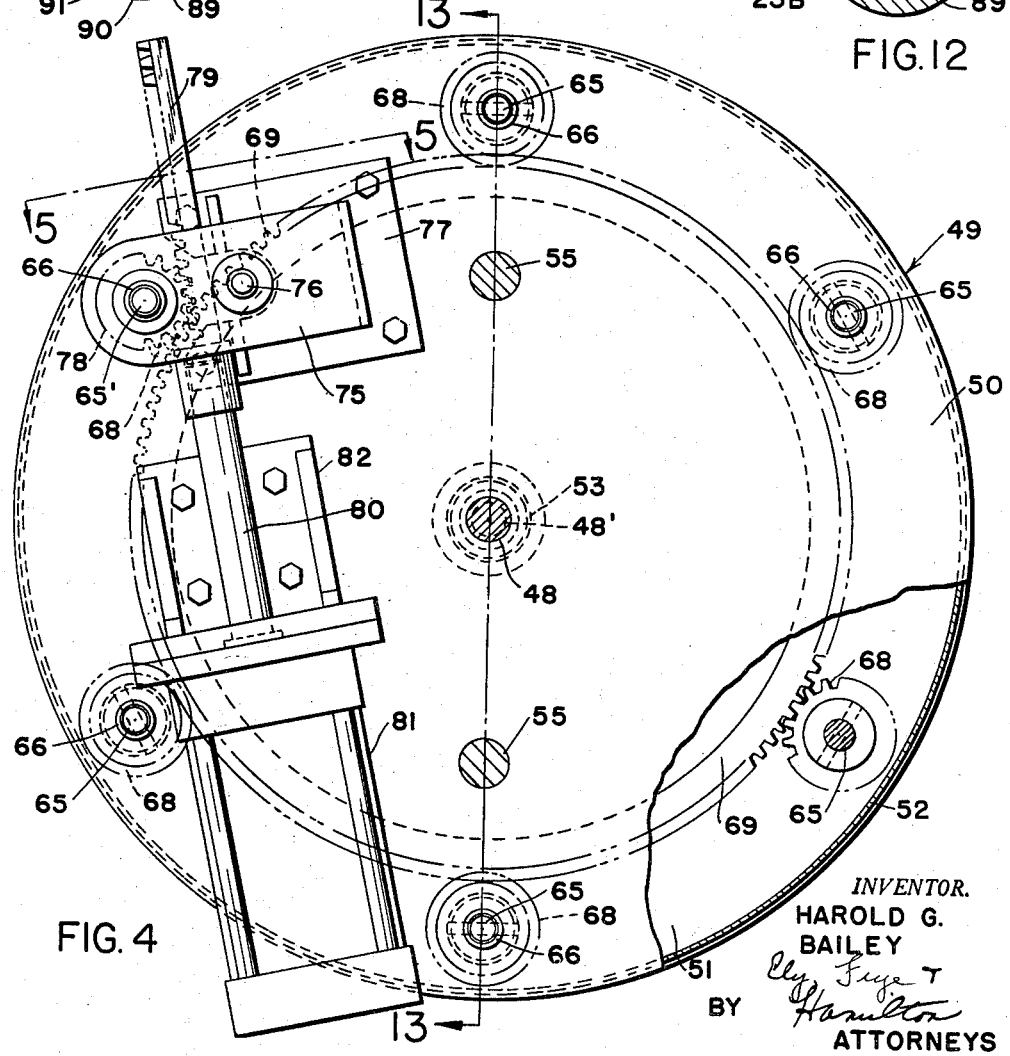

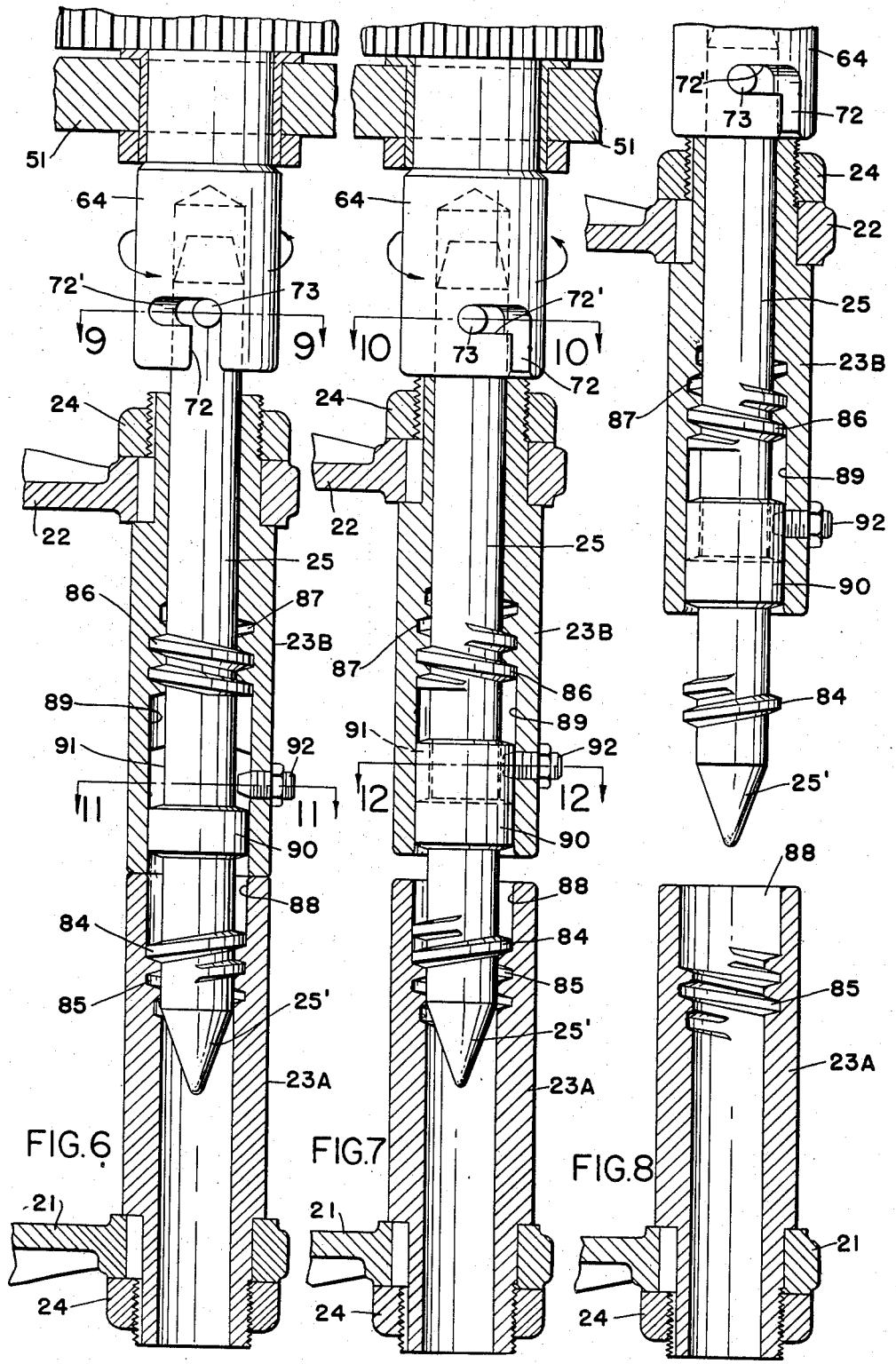

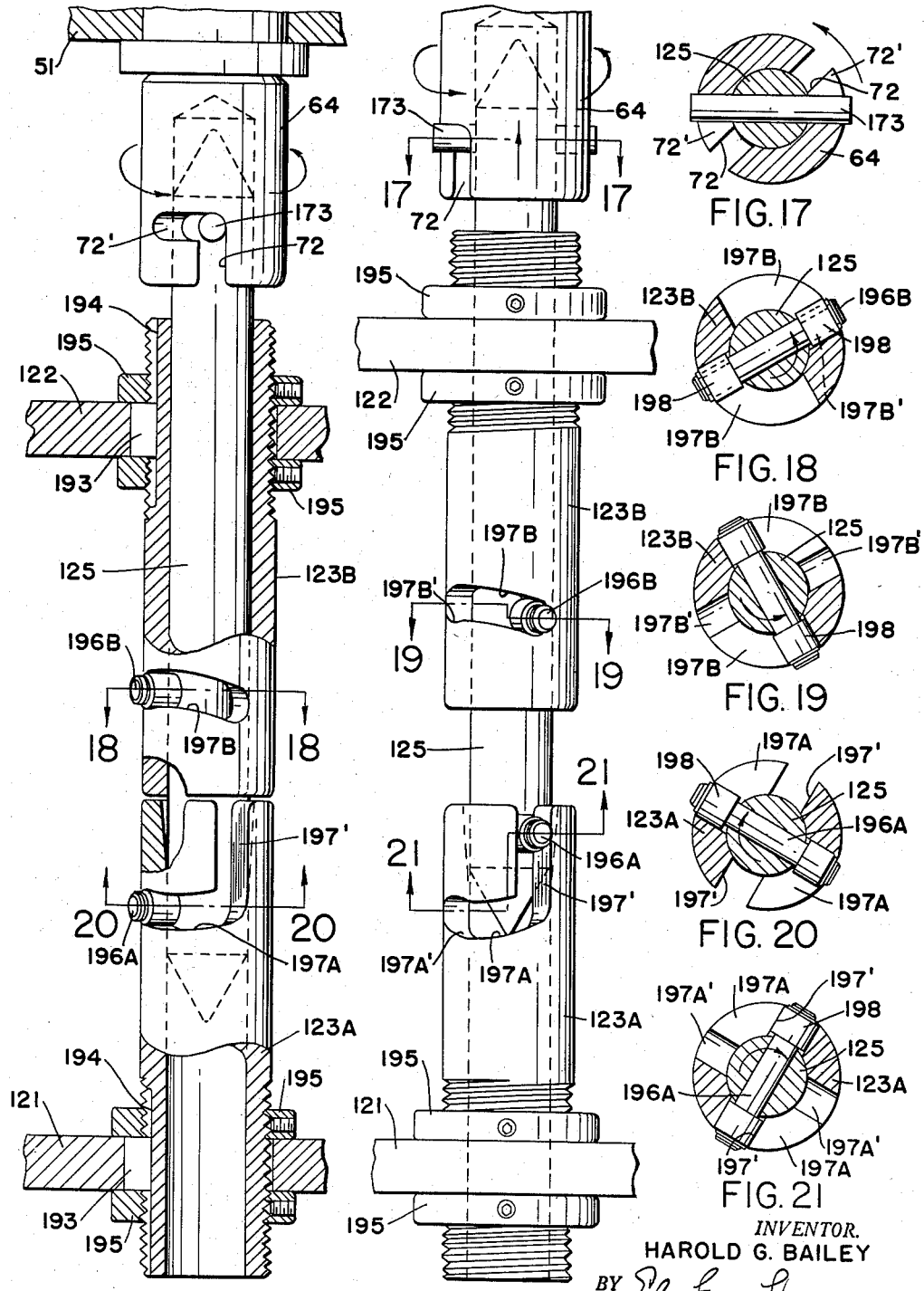

United States Patent Office 2,879,545
Patented Mar. 31, 1959

2,879,545

APPARATUS FOR SEPARATING AND CLAMPING MOLD SECTIONS IN ROTATIONAL CASTING MACHINES

Harold G. Bailey, Silver Lake, Ohio, assignor to The Sun Rubber Company, Barberton, Ohio, a corporation of Ohio Application September 15, 1955, Serial No. 534,435

8 Claims. (Cl. 18—43)

The invention relates to machines for rotationally casting hollow articles, preferably of plastisols, in nonporous molds, and more particularly to mechanism for opening and closing the molds at the charging and unloading stations.

The improved mold opening and closing mechanism is primarily intended to be used in conjunction with a turntable casting machine having a plurality of circumferentially arranged molds which are progressively advanced through charging, unloading and preheating stations, betweeen which the closed molds are constantly rotated upon two divergent axes during preheating and curing operations. A machine of this type is disclosed in the copending application of myself and Paul Rekettye, Serial No. 447,789, filed August 4, 1954, now Patent No. 2,834,986.

In said application the mold units are mounted around the outer periphery of the machine on radial shafts, and they rotate on the axes of said shafts while simultaneously rotating on axes perpendicular thereto, in order to distribute the plastisol evenly over the inner surfaces of the molds which are heated to cause the plastisol to gel and form hollow articles in the molds. The turntable is rotated intermittently so that each successive mold is stopped at the charging and unloading stations, and means are provided to stop each mold in a horizontal position to facilitate charging and unloading. Preferably, two banks of molds are mounted on each radial shaft, and two adjacent unloading stations are provided, one bank being uppermost at one station and the other bank being uppermost at the other station. When the turntable is stopped the molds between stations continue to rotate on divergent axes.

The mold opening and closing mechanism is moved vertically toward the stopped mold in registry therewith, turns the mold clamping means to release the mating mold parts, and then moves one mold part vertically away from the other to permit charging or unloading. This procedure is reversed to close and clamp the mold parts together.

An object of the present invention is to provide simple and effective means for opening each bank of molds at the charging and unloading stations, and for closing the molds after a predetermined time interval, or after the desired operations have been performed.

Another object is to provide improved means for registering each bank of molds in horizontal position with the mold opening means.

A further object is to provide improved means tightly holding the mold sections closed, said means adapted for cooperating with the mold opening and closing mechanism.

Another object is to provide improved mold opening means capable of exerting a strong initial opening force sufficient to break the mold sections apart.

While the mold operating mechanism herein is described as applied to a casting machine of the type shown in said application Serial No. 447,789, the invention may be applied to open and close molds in other types of machines. Moreover, various modifications and changes in details of construction may be made within the scope of the invention as defined in the appended claims.

The operation of the novel mold opening and closing mechanism may be coordinated with the operation cycle of the casting means by suitable and well-known electric switching mechanism (not shown).

Referring to the drawings:

Fig. 3 is a fragmentary plan sectional view on line 3—3 of Fig. 1.

Fig. 4 is an enlarged plan sectional view on line 4—4 of Fig. 1.

Fig. 5 is a sectional view on line 5—5 of Fig. 4.

Fig. 6 is a vertical sectional view through one of the clamping bolts holding the mold sections together, the sections being shown in closed position.

Fig. 7 is a similar view showing the bolt turned to separate the mold sections.

Fig. 8 is a similar view showing the sections further opened or separated.

Figs. 9 and 10 are plan sectional views on lines 9—9 and 10—10 of Figs. 6 and 7.

Figs. 11 and 12 are plan sectional views on lines 11—11 and 12—12 of Figs. 6 and 7.

Figures 13, 14:
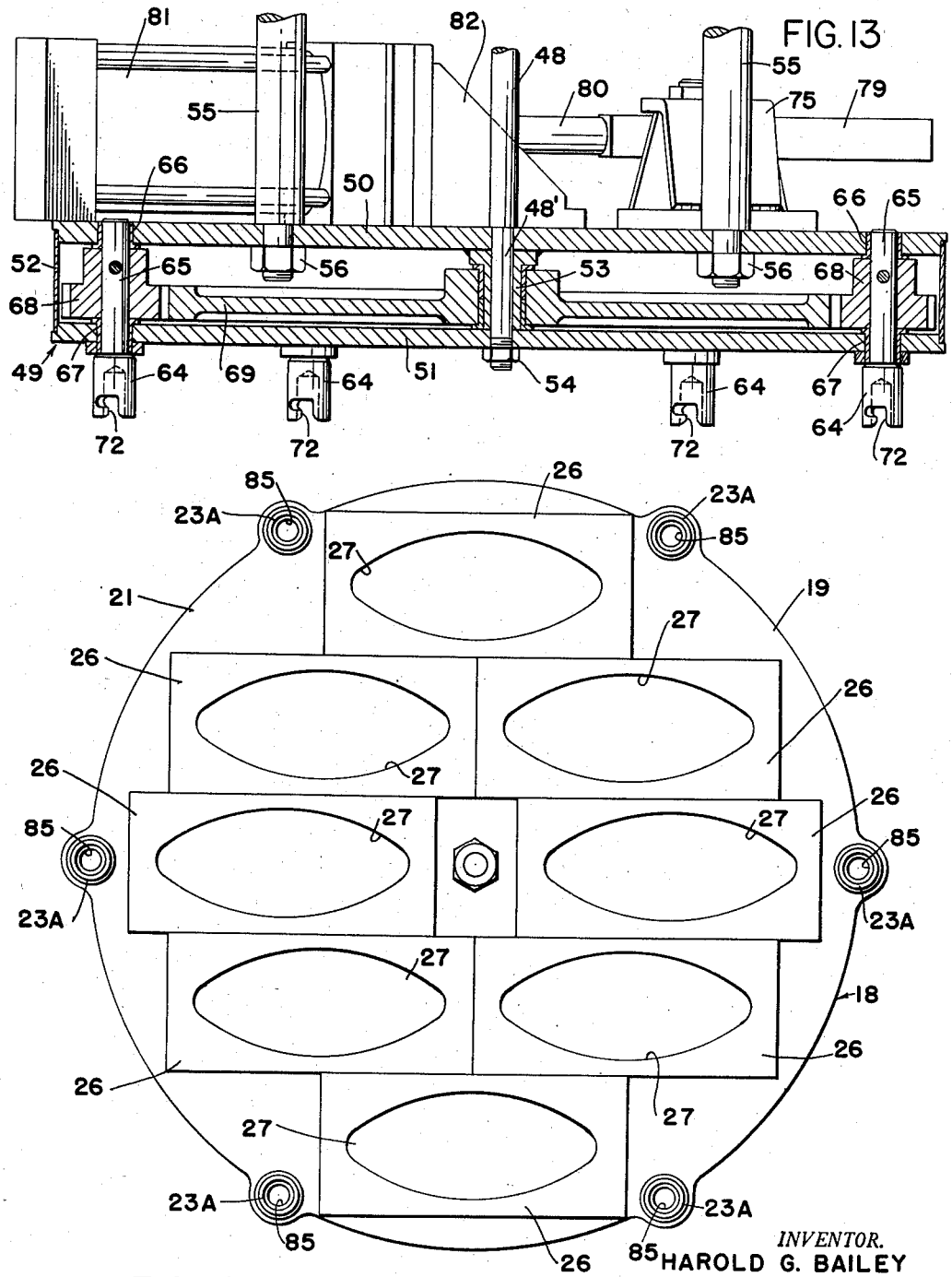

Fig. 13 is a cross sectional view on line 13—13 of Fig. 4.

Figure 2:
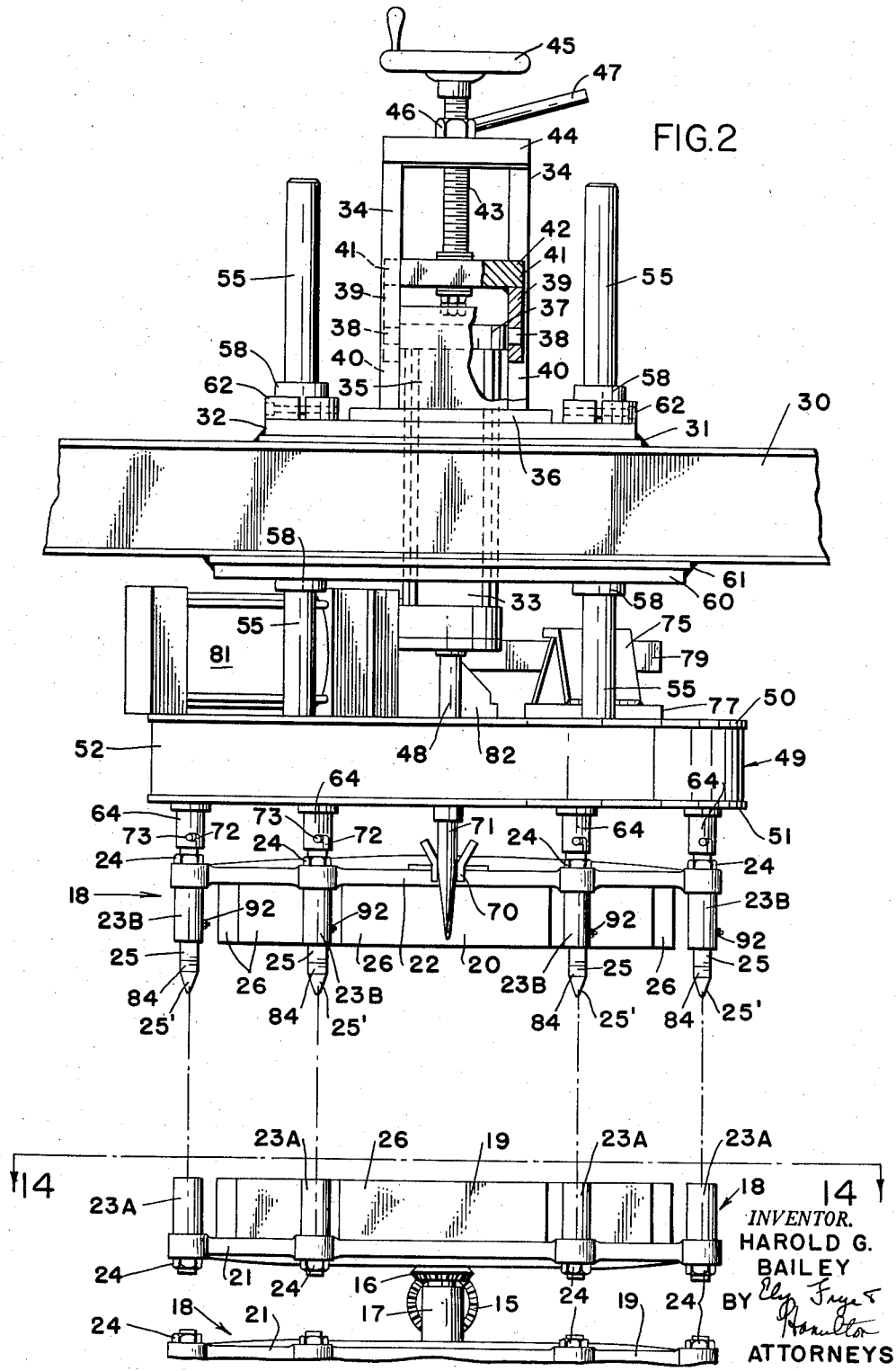
Fig. 2 is a similar view showing the molds in fully open position.

Fig. 14 is a plan view of one of the lower mold sections in open position, as on line 14—14, Fig. 2.

Fig. 15 is a view similar to Fig. 6 showing a modified form of means for clamping the mold sections together, the sections being shown in closed position.

Fig. 16 is a view similar to Fig. 7, showing the modified clamping means turned to separate the mold sections.

Figs. 17, 19 and 21 are cross-sectional views on lines 17—17, 19—19 and 21—21 of Fig. 16.

Figs. 18 and 20 are cross-sectional views on lines 18 and 20 of Fig. 15.

Figure 1:
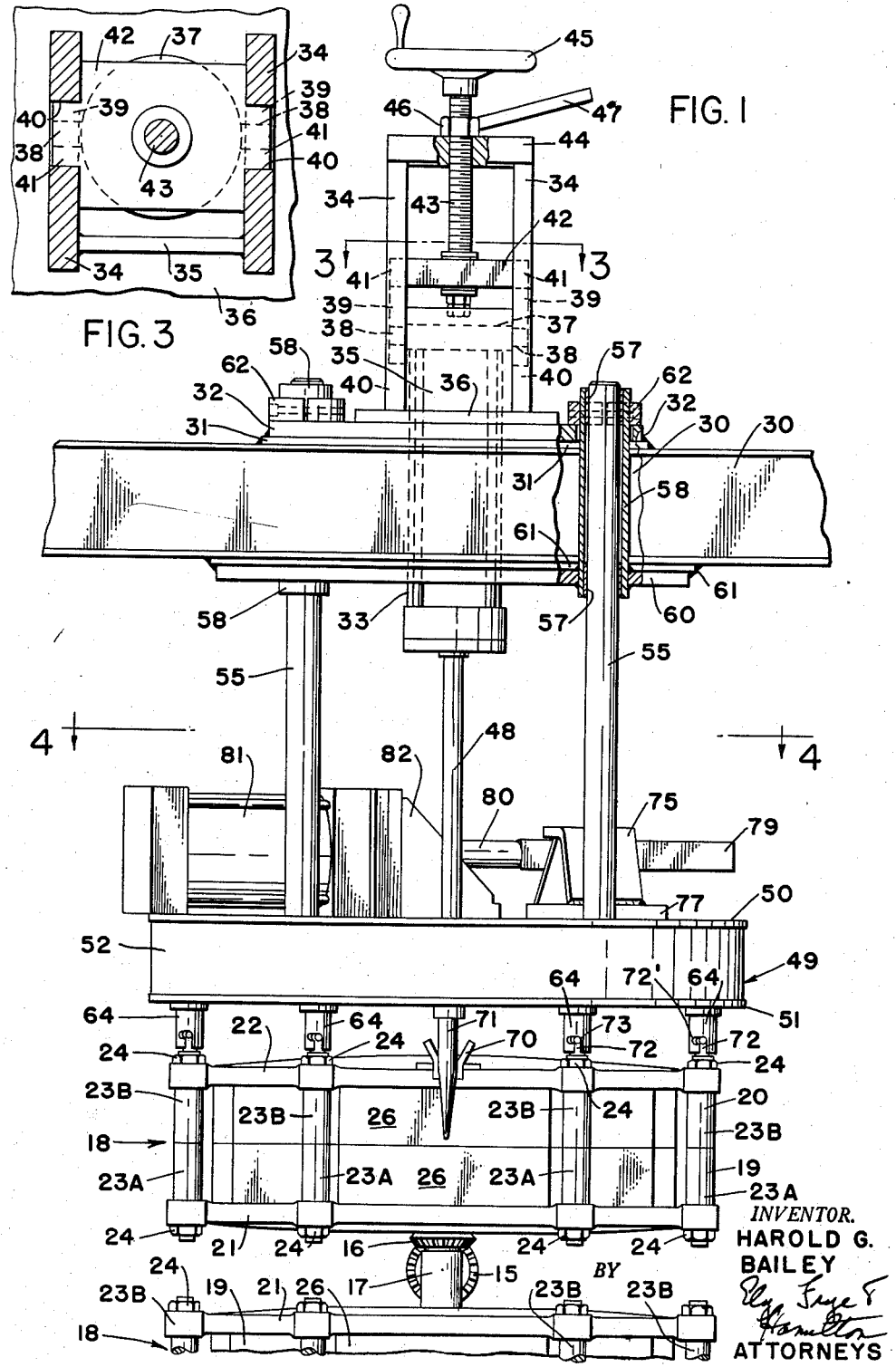
Fig. 1 is a fragmentary side elevation of the mold operating mechanism applied to a bank of molds in closed position.

Figs. 1 and 2 are views looking radially inward of a turntable casting machine such as shown in said application Serial No. 447,789, in line with one of the radial shafts on which the mold units are mounted for rotation on two divergent axes, one axis being that of the radial shaft and the other axis being at right angles thereto. In Figs. 1 and 2 the bevel gear 15 is on one of said radial shafts, the axis of which is the major axis of rotation of the mold units. The bevel gear 16 is on a shaft at right angles to the radial shaft, housed in sleeve 17 and constituting the minor axis of rotation of the mold units.

The mold units are indicated generally at 18 and each constitute inner and outer mating sections 19 and 20 respectively. The sections 19 and 20 are provided with end plates 21 and 22, respectively, having spacer sleeves 23A and 23B keyed therein at intervals around their peripheries and secured by nuts 24 screwed on the ends of the sleeves. When the molds are closed the ends of the sleeves register and may abut each other at the parting line of the molds. The clamping bolts 25 for holding the mold sections together are located in the sleeves 23A and 23B. If desired a pair of spacer sleeves and a clamping bolt may be provided at the centers of the end plates 21 and 22.

Each mold section may have a plurality or bank of molds 26 removably mounted thereon in any suitable and well-known manner. The molds 26 may provide a plurality of cavities for forming articles of any desired shape. As shown in Fig. 14, the molds have cavities 27 for forming toy footballs.

As each pair of mold units 18 reaches the charging station or one of the unloading stations, the turntable stops, and mechanism on the turntable stops the rotation of the mold units 18 in a horizontal position and in proper rotational position around their vertical axes, as shown in Figs. 1 and 2 as described in application Serial No. 447,789. At this point the mold opening mechanism is operated automatically by suitable switch mechanism. At the unloading stations only the uppermost mold unit is opened and closed by mechanism which is supported above the molds as shown in Figs. 1 and 2. At the charging station a duplicate mold opening and closing mechanism may be located under the lower mold unit so that both units are opened and closed simultaneously. In this application only the upper mold opening and closing mechanism will be described.

Above the mold units at the charging and unloading stations is a suitable supporting framework including a pair of laterally spaced horizontal beams 30 having bearing plates 31 resting on their upper surfaces, and a plate 32 resting on the bearing plates for supporting the frame of a hydraulic cylinder 33. The frame comprises side plates 34 having a spacer plate 35 therebetween, and a base plate 36 resting on plate 31. The upper end plate 37 of cylinder 33 is slidably mounted for vertical movement in the side plates 34 of the frame, and for this purpose the end plate 37 has diametrically opposite projecting lugs 38 mounted in vertical bars 39 which are slidable in slots 40 in side plates 34. The upper ends of the bars 39 form projections 41 on a horizontal adjusting plate 42 to the center of which is secured a vertical screw 43. The screw 43 is threaded through a top frame plate 44 and has a hand wheel 45 on its upper end. A lock nut 46 having a handle 47 is threaded on the screw for abutting the top frame plate 44. Thus rotation of the hand wheel 45 adjusts the vertical position of the cylinder 33 relative to the beams 30 and to the mold units positioned below the beams.

The piston rod 48 of cylinder 33 is secured at its lower end to the center of a mold operating plate assembly or unit indicated generally at 49. As best shown in Fig. 13, the plate assembly 49 comprises upper and lower vertically spaced plates 50 and 51 having an annular cover 52 extending around their outer peripheries. The lower reduced end 48' of the piston rod extends through both plates and a spacer bushing 53 between the plates, and a clamping nut 54 is screwed on the bottom of the rod 48' and abuts plate 51.

Laterally spaced guide rods 55 are secured at their lower ends in upper plate 50 by nuts 56, and as shown in Figs. 1 and 2, these guide rods extend vertically between the beams 30, and are slidably mounted in bushings 57 secured in the ends of guide sleeves 58. The guide sleeves 58 are secured at their lower ends, as by welding, in a plate 60 which abuts bearing plates 61 contacting the bottom surfaces of the beams 30, and their upper ends extend through plate 32 and are supported thereon by split clamps 62 abutting plate 32.

The bottom plate 51 of the mold opening unit 49 is provided with a plurality of sockets 64 depending below the plate and arranged circumferentially to register in axial alignment with the clamping bolts 25 of the uppermost mold 18 when it is stopped in a horizontal and rotationally oriented position, as shown in Fig. 1. Each of these sockets 64 is secured on the lower end of a shaft 65 (Fig. 13), and the shafts 65 are journaled in bushings 66 and 67 in the plates 50 and 51, respectively. Gear pinions 68 are secured on the shafts 65 within the compartment formed between plates 50 and 51, and the pinions all mesh with a bull gear 69 journaled on the center bushing 53 engirdling rod portion 48'.

The end plates 22 of the outer mold sections 20 are preferably provided at spaced peripheral locations with at least two mold aligning tapered guides 70, and tapered pins 71 on the periphery of the plate 51 of the mold operating unit 49 are adapted to enter the guides 70 as the unit 49 is lower, to insure accurate registration of the sockets 64 with the clamping bolts 25 when the mold is stopped in horizontal position. Each of the sockets 64 is provided with a bayonet slot 72 opening out through the bottom of the socket, and each of the bolts 25 has at its upper end a transverse pin 73 for entering one of the slots 72, as best shown in Figs. 6–8.

When the sockets 64 are moved downward over the upper ends of bolts 25 with the open ends of slots 72 passing over the pins 73 to the position of Figs. 6 and 9, rotation counterclockwise of the sockets, as shown by the arrows, to the position of Figs. 7 and 10, will lock the pins in the angles or horizontal portions 72' of the slots. Further rotation in the same direction will rotate the bolts 25 in the sleeves 23A and 23B.

The mechanism for rotating all of the sockets simultaneously is preferably a rack and pinion applied to the bull gear 69. As shown in Figs. 4 and 5, one of the shafts 65, indicated as 65', is extended above the plate 50 and journaled at its upper end in an angular bracket arm 75 supported by a spacer bolt 76 on a plate 77 bolted on the plate 50. A pinion 78 is secured on the extended portion of shaft 65' and meshes with a rack bar 79 passing between the pinion 78 and the spacer bolt 76. The rack bar 79 is on the outer end of a piston rod 80 operating in a fluid cylinder 81 mounted on the plate 50 by means of a bracket 82. Thus, an outward stroke of the piston rod 80 rotates shaft 65' counterclockwise, and through the bull gear 69 all of the shafts 65 are rotated in the same direction.

Referring to Figs. 6–8, each clamping bolt 25 is provided with opposite hand screw threaded portions within the mating sleeves 23A and 23B, so that rotation of the bolts in one direction moves the sleeves apart and opens the mold sections, and rotation of the bolts in the opposite direction closes the mold sections. Thus each bolt 25 preferably has on its lower end portion a right hand screw thread 84 for engaging the internal right hand screw thread 85 in sleeve 23A. Likewise, each bolt 25 has on an intermediate portion a left hand screw thread 86 for engaging the internal left hand screw thread 87 in sleeve 23B.

Above the right hand internal thread 85, each sleeve 23A has an enlarged bore 88 of the same diameter as the base of the thread, and below the left hand internal thread each sleeve 23B has an enlarged bore 89 of the same diameter as the base of the thread. Preferably, the lower end of the bolt 25 below the thread 84 is tapered as shown at 25' to facilitate its entry into the internal thread 85. The bolt 25 has a journal portion 90 rotatable in the bore 89, and the journal 90 has an arcuate slot 91 (Figs. 11 and 12) cooperating with a set screw 92 in the sleeve to limit rotation of the bolt.

In the mold opening operation, when a mold unit 18 is stopped in the horizontal position of Fig. 1, directly under the unit 49, the piston rod 40 is lowered by admitting fluid to the upper end of cylinder 33 in a suitable and well-known manner. The valve for controlling the entrance and discharge of fluid to and from the cylinder may be operated manually or by electric switch mechanism, as desired. As the unit 49 is lowered, the pins 71 enter the guides 70 and register the pins 73 of the bolts 25 with the slots 72 of the sockets 64. After the pins 73 have seated in the slots 72, the cylinder 81 is operated to rotate the sockets counterclockwise and first lock the pins in slots 72', as shown in Fig. 10.

Further rotation in the same direction through substantially 180°, as indicated in Figs. 11 and 12, and as limited by screws 92 in slots 91, exerts a strong initial opening force causing the mating sleeves 23A and 23B to separate at the parting line of the molds, as shown in Fig. 7, due to the action of the right and left handed threads 84 and 86. At this point, the threads 84 are fully disengaged from the internal threads 85, and the piston rod 40 is then actuated to raise the unit 49 as shown in Fig. 8 and ultimately to the position of Fig. 2, thus fully opening the upper mold unit to allow removal of the molded articles therein. After the molds are unloaded, the piston rod 40 is lowered to close the molds to the position of Fig. 7, the piston rod 80 is actuated to rotate the sockets clockwise to first clamp the mold units together and then release the pins 73 from the slots 72′, and the piston rod 40 is then raised to elevate the unit 49 above the upper mold unit.

Following this operation, the turntable casting machine is rotated or indexed sufficiently to rotate the mold units on their divergent axes until the other mold unit 18 is positioned uppermost and rotationally oriented in a horizontal position, at an adjacent station with the mold unit previously opened positioned underneath. At this station another mold opening unit identical to the mold opening unit 49 is then operated to open, separate and close the upper mold unit to allow unloading thereof. Each successive pair of mold units is stopped at the two unloading stations in the same manner.

If desired, a mold supporting and aligning mechanism may be provided at each of these stations, to move into position when the mold unit is stopped and align and support the lower mold as the upper one is opened, unloaded and closed.

The modified form of clamping means for the mold sections shown in Figs. 15–21, preferably includes clamping bolts 125 located in sleeves 123A and 123B non-rotatively secured in the end plates 121 and 122 of the mating mold sections by keys 193 vertically slidable in keyways 194 in the sleeves. The sleeves are externally threaded along the lengths of the keyways and lock nuts 195 are screwed thereon above and below the end plates 121 and 122. Thus by loosening the lock nuts the sleeves 123A and 123B can be adjusted vertically in the plates 121 and 122.

The sockets 64 on the bottom plate 51 of the mold opening unit register in axial alignment with the clamping bolts 125, and the bayonet slots 72 of the sockets fit over transverse pins 173 in the upper ends of the bolts in the same manner as described in connection with the clamping bolts 25, and rotation of the sockets counter-clockwise as shown by the arrows in Figs. 15–17, will first lock the pins in the slots and then rotate the bolts 125 in the sleeves 123A and 123B.

In this embodiment the bolts 125 are provided with transverse locking pins 196A and 196B for cooperating with cam slots 197A and 197B in the sleeves 123A and 123B, respectively. The slots 197A are bayonet slots which have vertical connecting portions 197′ opening out through the ends of the sleeves 123A so that the bolts 125 and pins 196A can be withdrawn upwardly out of sleeves 123A as shown in Fig. 16. Preferably, the pins 196A and 196B have rollers 198 engaging the edges of the slots 197A and 197B.

In the mold opening operation when a closed mold unit is stopped in proper position under the mold opening mechanism, the mechanism is lowered and the pins 173 enter the slots 72 of the sockets 64, as shown in Fig. 15. The sockets are then rotated, as previously described, to first lock the pins 173 in the horizontal portions of the slots 72. Further rotation of the sockets through substantially 90° will rotate the bolts 125 and the pins 196A and 196B will move from their positions shown in Fig. 15 to the opposite ends of the cam slots 197A and 197B.

The contour of the cam slots is such that this movement of the pins 196A and 196B therein exerts a strong and positive force on the sleeves 123A and 123B axially in opposite directions causing initial breaking apart or separation of the mold sections. When the pins 196A and 196B reach the opposite ends of the slots, the mold opening mechanism including plate 51 is moved upwardly to withdraw the pins 196A out of slots 197′ and further separate the molds. On closing the molds the procedure is reversed.

It will be noted that the closed ends of cam slots 197A and the aligned ends of slots 197B are provided with slightly offset notches 197A′ and 197B′ in which the rollers of pins 196A and 196B engage when the mold sections are completely closed, thus locking the mold sections together in closed position. These notches serve also to prevent the bolts 125 from turning in their sleeves when the mold sections are closed.

The improved mold opening and closing mechanism provides simple and effective means cooperating with the mold clamping means for opening and closing banks of molds in horizontal charging or unloading positions.

What is claimed is:

1. In combination with a mold having two mating parts normally clamped together by bolts extending therethrough, mold opening and closing mechanism comprising an operating unit having sockets in axial alignment with said clamping bolts and adapted to rotate said bolts, pinions on said sockets, and rack and gear means operatively connected to said pinions to release the bolts simultaneously from one mold part, cooperating means on the bolts and sockets to secure them together on rotation of said sockets, cooperating means on said bolts and said mold parts to move one mold part away from the other on partial rotation of said bolts, and means to move said operating unit toward and away from said mold with said sockets and bolts in alignment.

2. Mold opening and closing mechanism for two mating mold parts having clamping bolts securing said parts together, an operating unit having sockets in axial alignment with and adapted to rotate said bolts, cooperating bayonet locking means on said bolts and sockets, pinions on said sockets, gear means operatively connected to said pinions to rotate all of said sockets simultaneously to clamp and release the mold parts, cooperating means on said bolts and said mold parts to move one mold part away from the other on partial rotation of said bolts, and means to move said operating unit toward and away from said mold with said bolts and sockets in axial alignment.

3. In combination with a mold having two mating parts and clamping bolts extending through said parts, mold opening and closing mechanism comprising a frame, a mold operating unit mounted on the frame for movement toward and away from said mold, sockets on said unit aligned with and adapted to rotate said bolts, cooperating means on said bolts and said mold parts to move one mold part away from the other on partial rotation of said bolts, means to rotate said sockets simultaneously to first separate the mold parts and then release the bolts from one mold part, cooperating means on the bolts and sockets to secure them together on initial rotation of said sockets, and means to move said operating unit toward and away from said mold with said sockets and bolts in alignment.

4. In combination with a mold having two mating parts and clamping bolts extending through said parts, mold opening and closing mechanism comprising a frame, a mold operating unit mounted on the frame for movement toward and away from said mold, sockets on said unit aligned with and adapted to rotate said bolts, means to rotate said sockets simultaneously to release the bolts from one mold part, means on the other mold part to limit rotation of the bolts therein after the bolts are released from said one mold part, cooperating means on the bolts and sockets to secure them together on initial rotation of said sockets, and means to move said operating unit toward and away from said mold with said sockets and bolts in alignment.

5. In combination with a mold having two mating parts including aligned sleeves and clamping bolts extending through said sleeves, mold opening and closing mechanism comprising an operating unit having sockets for aligning with and rotating said bolts, means to rotate said sockets simultaneously, axially spaced transverse pins on each of said bolts, cam slots in said aligned sleeves engaging said pins and adapted to move said sleeves toward and away from each other, the slot in one sleeve having one end open to allow withdrawal of the pin therefrom for further separation of the sleeves.

6. In combination with a mold having two mating parts including aligned sleeves and clamping bolts extending through said sleeves, mold opening and closing mechanism comprising an operating unit having sockets for aligning with and rotating said bolts, means to rotate said sockets simultaneously, axially spaced transverse pins on each of said bolts, cam slots in said aligned sleeves engaging said pins and adapted to move said sleeves toward and away from each other, the slot in one sleeve having one end open to allow withdrawal of the pin therefrom for further separation of the sleeves, and the other end of said latter slot having a closed offset notch for locking the pin therein when the sleeves have been moved together in mold closed position.

7. In combination with a mold having two mating parts including aligned sleeves and clamping bolts extending through said sleeves, mold opening and closing mechanism comprising an operating unit having sockets for aligning with and rotating said bolts, means to rotate said sockets simultaneously, axially spaced transverse pins on each of said bolts, cam slots in said aligned sleeves engaging said pins and adapted to move said sleeves toward and away from each other, the slot in one sleeve having a closed offset notch at one end for locking the pin therein when the sleeves have been moved together in mold closed position, and the slot in the other sleeve having a closed offset notch at the opposite end for locking the pin therein when the sleeves are separated.

8. In combination with a mold having two mating parts including aligned sleeves and clamping bolts extending through said sleeves, mold opening and closing mechanism comprising an operating unit having sockets for aligning with and rotating said bolts, means to rotate said sockets simultaneously, axially spaced transverse pins on each of said bolts, cam slots in said aligned sleeves engaging said pins and adapted to move said sleeves toward and away from each other, the slot in one sleeve having a closed offset notch at one end for locking the pin therein when the sleeves have been moved together in mold closed position, said slot having its other end open to allow withdrawal of the pin axially of the bolt for completely separating the sleeves, and the slot in the other sleeve having a closed offset notch at the end opposite to the closed end of said one sleeve for locking the pin therein when the sleeves are separated.

References Cited in the file of this patent

UNITED STATES PATENTS

| | | |
|---|---|---|
| 222,229 | Beals et al. | Dec. 2, 1879 |
| 1,314,512 | Dicks | Sept. 2, 1919 |
| 1,501,338 | Henry | July 15, 1924 |
| 2,069,882 | Hall | Feb. 9, 1937 |
| 2,257,695 | Lihotzky | Sept. 30, 1941 |
| 2,298,057 | Kelm | Oct. 6, 1942 |
| 2,691,314 | Stevens et al. | Oct. 12, 1954 |
| 2,720,803 | Rice et al. | Oct. 18, 1955 |
| 2,796,789 | Rice et al. | June 25, 1957 |